(12) United States Patent
Larsen et al.

(10) Patent No.: US 7,833,558 B2
(45) Date of Patent: Nov. 16, 2010

(54) METHOD FOR PREPARING FIBRE-CONTAINING PECTIN AND PRODUCTS AND USES THEREOF

(75) Inventors: Peter Fromholt Larsen, Højbjerg (DK); Morten Juulsgaard Mathiasen, Brande (DK)

(73) Assignee: KMC Kartoffelmelcentralen AMBA, Brande (DK)

( * ) Notice: Subject to any disclaimer, the term of this patent is extended or adjusted under 35 U.S.C. 154(b) by 1112 days.

(21) Appl. No.: 10/563,455

(22) PCT Filed: Jul. 7, 2004

(86) PCT No.: PCT/DK2004/000487
§ 371 (c)(1), (2), (4) Date: Aug. 31, 2006

(87) PCT Pub. No.: WO2005/003178
PCT Pub. Date: Jan. 13, 2005

(65) Prior Publication Data
US 2007/0031572 A1    Feb. 8, 2007

(30) Foreign Application Priority Data
Jul. 7, 2003    (DK) ............... 2003 01037
Jan. 27, 2004    (DK) ............... 2004 00112

(51) Int. Cl.
*A23L 1/05*    (2006.01)
(52) U.S. Cl. .............. 426/577; 426/506; 426/573
(58) Field of Classification Search .............. 426/506, 426/573, 577, 615, 658
See application file for complete search history.

(56) References Cited

U.S. PATENT DOCUMENTS

| | | | |
|---|---|---|---|
| 2,386,323 A | 10/1945 | Lineweaver et al. | |
| 2,444,266 A | 6/1948 | Owens et al. | |
| 2,480,710 A | 8/1949 | Bryant | |
| 2,754,214 A | 7/1956 | Leo et al. | |
| 4,136,209 A | 1/1979 | Fox | |
| 4,143,172 A | 3/1979 | Mitchell et al. | |
| 5,071,970 A | 12/1991 | Le Grand et al. | |
| 5,567,462 A | 10/1996 | Ehrlich | |
| 5,688,923 A | 11/1997 | Gerrish et al. | |
| 6,261,626 B1 | 7/2001 | Buchholt et al. | |
| 2002/0142992 A1 | 10/2002 | Scherr | |

FOREIGN PATENT DOCUMENTS

| | | |
|---|---|---|
| DE | 4 013 765 | 10/1991 |
| DE | 4013765 | 10/1991 |
| DE | 4042405 | 3/1992 |
| FR | 2375255 | 7/1978 |
| GB | 582147 | 11/1946 |
| GB | 1 170 858 | 11/1969 |
| GB | 1170858 | 11/1969 |
| JP | 59 124902 | 7/1984 |
| JP | 59124902 | 7/1984 |
| JP | 61 076502 | 4/1986 |
| JP | 61076502 | 4/1986 |
| JP | 61 089204 | 5/1986 |
| JP | 61 089205 | 5/1986 |
| JP | 61089204 | 5/1986 |
| JP | 61089205 | 5/1986 |
| RU | 2116075 | 7/1998 |
| WO | WO 01/96404 | 12/2001 |
| WO | WO 0196404 | 12/2001 |

*Primary Examiner*—Leslie Wong
(74) *Attorney, Agent, or Firm*—Knobbe Martens Olson & Bear LLP

(57) ABSTRACT

A method is provided for treating pectin-containing plant materials in a manner to obtain fiber-containing pectin products, and subsequently pectin products, having a high molecular weight of the pectin polymer and a homogeneous distribution of the de-esterified sites in the pectin polymer and thereby providing products having improved gel-forming and/or viscous giving properties.

29 Claims, 1 Drawing Sheet

METHOD FOR PREPARING FIBRE-CONTAINING PECTIN AND PRODUCTS AND USES THEREOF

CROSS-REFERENCE TO RELATED APPLICATIONS

This application is the U.S. National Phase filing under 35 U.S.C. §371 of PCT/DK2004/000487, filed Jul. 7, 2004, which designated the United States and was published in English, which claims priority to Danish Patent Application Nos. PA 200301037, filed Jul. 7, 2003, and PA 200400112, filed Jan. 27, 2004. The contents of these applications are expressly incorporated herein by reference in their entireties.

FIELD OF THE INVENTION

The present invention relates to the field of preparing pectin products from pectin-containing plant materials. In particular, a novel method for providing novel fibre-containing pectin products as well as novel pectin products obtained from said fibre-containing pectin product is provided.

TECHNICAL BACKGROUND AND PRIOR ART

In the industrial production of potato starch from potatoes, the so-called potato pulp, the fibrous mass of the potato, is among the by-products obtained. Similar by-products or waste products are known from other agriculturally based productions, e.g., sugar beet slices from the production of sugar from sugar beets, citrus peels and citrus pulp from the manufacture of juice and ethereal oils from citrus fruits, and pomace residues from cider production.

These plant by-products are often considered as waste products to be disposed of in the most appropriate and most inexpensive way. However, it will be understood that there may be quite obvious advantages by further developing such plant by-products into products of more commercial value.

A common feature of these by-products is that they consist essentially (about 80-100%) of soluble and insoluble plant fibres, of which about 60-80% are dietary fibres, including three biopolymers: cellulose, hemicellulose and pectin involved in the structure of all plant cell walls, which can be conceived as a cellulose-hemicellulose-pectin network in which pectin, apart from being a structural element, also constitutes the "cement" imparting rigidity to the plant cells. This complex structure in which pectin is attached to the other cell wall components by covalent bonds, hydrogen bonds, and/or ionic interaction is often termed protopectin. Pectin, per se, can be obtained by controlled, acidic or basic hydrolytic extraction of protopectin.

Pectin is a linear polymer composed of units of a-D-galacturonic acid attached by a-1,4-glycoside bonds to form long chains of polygalacturonic acid. The galacturonic acid units are esterified with methanol to a varying degree. A distinction is thus made between high-ester pectin having a degree of esterification (DE) of greater than 50% and low-ester pectin having a degree of esterification of less than 50%. The degree of esterification is defined as the number of methyl-esterified galacturonic acid units expressed as a percentage of the total galacturonic acid units in the pectin molecule and may thus be a value between 0% and 100%.

In pectin from some types of plant material, e.g. potatoes and sugar beets, a varying part of the galacturonic acid units may, in addition, be acetylated, expressed as the degree of acetylation (DAc), which is defined, analogous to the degree of esterification, as the number of acetylated galacturonic acid units as a percentage of all galacturonic acid units.

Neutral sugars, such as galactose, glucose, rhamnose, arabinose and xylose, may also be part of the pectin polymer as side-chains to or as members in the polygalacturonic acid chain.

Hemicellulose is a heterogeneous group of polysaccharides containing several kinds of hexose and pentose sugars and, in some cases, residues of uronic acid. These polymers are classified according to the type of sugar residues being dominant and are individually referred to as xylanes, arabinogalactans, glucomannans and so on.

It is known in the prior art how to de-esterify pectin and pectin-containing materials with acids or bases.

Thus, U.S. Pat. No. 5,567,462 discloses a method of preparing pecto-cellulosic compositions and pectin from pectin-containing plant raw materials, such as citrus peels, sugar beet pulp, sunflower residues, and pomace residues. The method consists of treating the comminuted plant raw materials with an acid, e.g., phosphoric or nitric acid, or with a base, e.g., sodium hydroxide or sodium carbonate, to give a mixture consisting of a solid phase containing cellulose components and a liquid phase containing dissolved pectin. The mixture is mashed, neutralised and finally dried to form pecto-cellulosic dry matter. The mashed mixture may also be separated into a solid and a liquid phase, which are neutralised individually and dried to give a pectin product and a pecto-cellulosic product.

It is also known in the prior art how to de-esterify pectin or a pectin-containing material with aqueous ammonia in an organic solvent, e.g. isopropanol, in which pectin is non-soluble. This technique is for example disclosed in U.S. Pat. No. 2,480,710.

DE-4,013,765 and DE-4,042,405 disclose the preparation of amidopectin and dietetic fibres and fillers in the treatment of dried plant residues, e.g. sugar beet pulp, with gaseous ammonia and subsequent extraction with water or highly diluted sodium hydroxide. By adding acid to the concentrated extract, the result is amidopectin, and the insoluble residue following the extraction results in dietetic fibres and fillers.

It has now been found that, without dissolving pectin and without using organic solvents, it is possible to carry out the de-esterification of pectin in an entirely aqueous system in the treatment of a pectin-containing plant material, which has been swollen in an aqueous solution containing neutral salts prior to the de-esterification treatment.

Thus, it is a purpose of the present invention to provide a new and simple method of treating pectin-containing plants under de-esterifying conditions, thereby achieving fibre-containing pectin products as well as isolated pectin products of high commercial value and high practical use.

SUMMARY OF THE INVENTION

Accordingly, one aspect of the present invention provides a method for providing a fibre-containing pectin product from a plant material. Said method comprising the steps of:
  (i) providing an in situ reaction system by swelling the plant material in an aqueous solution, where said aqueous solution comprising at least one salt,
  (ii) subjecting pectin present in the swollen plant material from step (i) to a de-esterification treatment, and
  (iii) separating the de-esterified fibre-containing pectin product.

In yet an aspect of the present invention a method is provided for providing a pectin product, said method comprising the steps of:

(i) providing a fibre-containing pectin product as described above,
(ii) adding an extraction medium to the fibre-containing pectin product providing an extraction suspension,
(iii) adjusting the pH of the extraction suspension to a pH in the range of 1-12,
(iv) adjusting the temperature of the extraction suspension to a temperature in the range of 20-100° C., and
(v) isolating the pectin product from the aqueous phase of the extracting medium.

In a further aspect of the present invention a fibre-containing pectin product and/or a pectin product obtainable by the methods described above is provided.

A further aspect of the present invention provides a product comprising pectin that fulfils at least one of following requirements:
(i) the product has a viscosity of at least 5 cp when mixed in a concentration of at the most 1% (w/w) of pectin in a solution and measured by method A, or
(ii) the product has a viscosity which is at least 2 times higher than the viscosity of conventional used pectin products when mixed in a concentration of at the most 1% (w/w) of pectin in a solution and measured by method A.

DETAILED DISCLOSURE OF THE INVENTION

Figure 1:
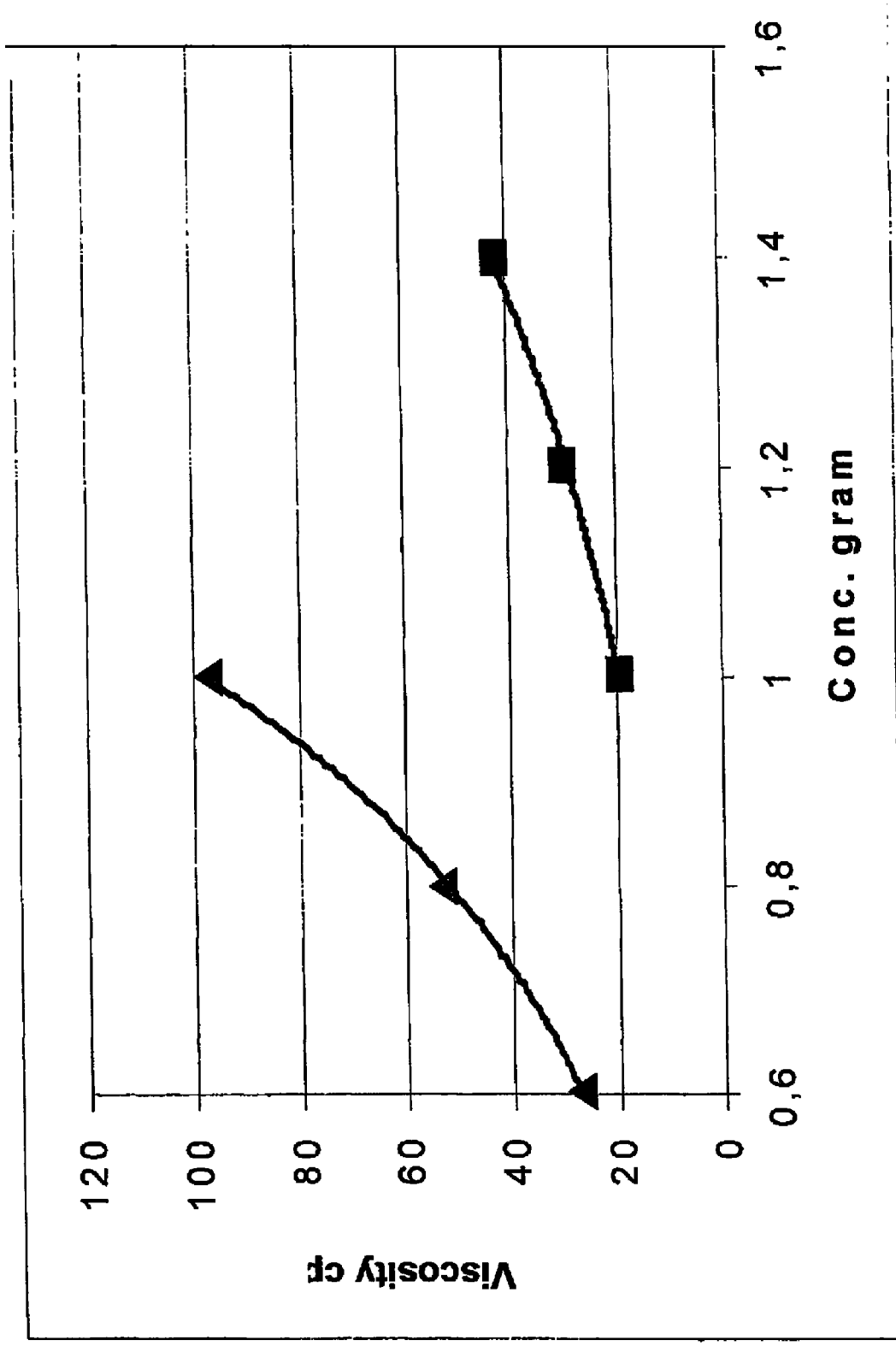
FIG. 1 shows the viscosity of the pectin products obtained by the present invention.

The primary objective of the present invention is to provide a method for treating pectin-containing plant materials in a manner to obtain fibre-containing pectin products, and subsequently pectin products, having an high molecular weight of the pectin polymer and a more homogeneous distribution of the de-esterified sites in the pectin polymer and thereby providing products having improved gel-forming and/or viscous giving properties.

In the present context the term "high molecular weight of the pectin polymer" relates to the size of the pectin polymer, indicating the number of -D-galacturonic acid units in the pectin polymer, which is larger than the size of the pectin polymer obtained by conventional used methods because in the conventional used methods the treatments with acid and alkaline solutions breaks down the dissolved pectin polymer into smaller chains whereas the treatment provided by the present invention maintain the pectin polymer substantially intact.

In the present context the term "homogeneous distribution of the de-esterified sites" relates to an even distribution of the ester groups within the pectin polymer which has been de-esterified and thereby is capable of binding to other pectin polymers through metal ions in a constant and even manner. On the contrary, the distribution of the de-esterifed sites in conventional pectin polymers are most often located in clusters causing the pectin polymers to be very reactive with metal ions and the reaction of the pectin becomes very difficult to control.

Such a high molecular weight of the pectin polymer and a more homogeneous distribution of the de-esterification sites may be obtained by the methods according to the present invention, e.g. a method for providing a fibre-containing pectin product from a plant material is provided, said method comprising the steps of: (i) providing an in situ reaction system by swelling the plant material in an aqueous solution, where said aqueous solution comprising at least one salt, (ii) subjecting pectin present in the swollen plant material from step (i) to a de-esterification treatment, and (iii) separating the de-esterified fibre-containing pectin product.

The Plant Materials

In the context of the present invention the terms "plant material", "pectin-containing plant material" and "pectin-containing plant starting material" are used interchangeably and relates to any kind of plant material comprising pectin which may/can be used for preparing fibre-containing pectin products or pectin products.

Suitable materials are pectin-containing materials obtained from native vegetable materials in a fresh or dried state, containing pectin with a degree of esterification greater than 30%, preferably greater than 40%, more preferably greater than 50%, and typically from 60% to 70%.

In a preferred embodiment of the present invention suitable native pectin-containing plant materials include peels or pulp from citrus fruits, such as lemon, orange, mandarin, lime and grapefruit. Other suitable native pectin-containing plant materials include sugar beet slices, potato pulp and pomace residues from apples.

The content of pectin in these pectin-containing plant materials differ for the individual plant materials, on dry matter basis, e.g., from about 30% to 40% by weight of pectin in citrus peels and from about 15% to 30% by weight of pectin in potato pulp.

Swelling

Pectin may be essentially insoluble or no more than only poorly soluble in the aqueous solution as the method of the invention may preferably be based on an alkaline de-esterification of pectin occurring at the natural location of the pectin in the plant material, i.e., in situ.

In a preferred embodiment of the present invention the plant material is swelled in an aqueous solution providing an in situ reaction system. In the present context the term "in situ reaction system" relates to a state in which the plant material act as the reaction chamber by being swelled and become permeable and thereby allowing the passage of the e.g. alkaline reagent into the plant material and the passage of dissolved substances out of the plant material without dissolving the pectin polymer. Furthermore, the "in situ reaction system" makes it possible to subject the pectin polymer in the plant material to de-esterification treatment and/or amidation treatment within the plant material structure.

During the treatment with e.g. the alkaline reagent, the protopectin in the plant material is transformed into water-soluble pectins under such conditions that the water-soluble pectins formed remain in a non-dissolved state and aggregated with the insoluble plant cell constituents, such as cellulose and hemicellulose, and under which at least a part of the non-pectin-containing substances, such as, e.g., proteins, sugars and colorants are removed.

Pectin, dissolved during the treatment with the aqueous solution and/or the alkaline reagent, will tend to be lost to the reaction mixture, thereby resulting in a loss of pectin. A further drawback of dissolved pectin is the increased viscosity of the reaction mixture, which makes the separation of the treated plant material highly difficult.

The aqueous solution is to allow the plant material to remain in a state in which it is essentially structurally intact. This is due to the fact that the e.g. alkaline de-esterification is dependent on the plant material being swollen and permeable, thereby allowing the passage of the e.g. alkaline reagent into the plant material and the passage of dissolved substances out of the plant material. Since the cellulose-hemicellulose-pectin network may be to serve as a "container" in which the reaction occurs, the structure of this network is to be kept intact and must not be disintegrated as this will result in the formation of a paste being difficult to handle.

In a preferred embodiment of the present invention the aqueous solution does not contain an organic solvent. Preferably, the aqueous solution is an inorganic aqueous solution.

The above conditions may be provided according to the present invention by the pectin-containing plant starting material being suspended and swollen in an aqueous, saline solution. In the context of the present invention the term "saline solution" relates to a solution comprising at least one salt.

The aqueous solution, in which the pectin-containing plant starting material is swelled may contain at least one added water-soluble and neutral salt selected from the groups consisting of sodium salts, potassium salts and calcium salts, and mixtures thereof. Particularly preferred are chlorides, such as sodium chloride, potassium chloride and calcium chloride, and mixtures thereof. However, also nitrates, such as sodium nitrate, potassium nitrate and calcium nitrate, may be used. Other salts applicable in the present invention may be found in EP 0 664 300 which is hereby incorporated by reference.

The amount of salt added to the solution, in which the pectin-containing plant starting material is suspended and swelled, may be selected so that it corresponds to a salt concentration of from 1 mmol to 30 mmol per gram of dry matter of pectin-containing plant material, preferably from 5 mmol to 15 mmol per gram of dry matter of pectin-containing plant material.

In a preferred embodiment of the present invention swelling of the plant material provides a suspension in which the content of plant material dry matter is ranging from 1%-50% by weight, such as from 1%-30% by weight, e.g. from 1%-25% by weight, such as from 1%-15% by weight, e.g. from 1%-10% by weight, typically from 4% to 8% by weight, such as 6% by weight.

The suspension of the pectin-containing plant starting material in the aqueous, saline solution occurs, while stirring, at a temperature ranging from about 0° C. to about 120° C., preferably ranging from 0° C. to 50° C., e.g. from 0-20° C., such as form 0-10° C., e.g. from 0-5° C., such as about 3.5° C. The temperatures in the range of 0-20 are often preferred because otherwise there is a risk that the plant material swells to quickly and starts to dissolve and in some cases the temperature can be as low as in the range of −10° C. to 20° C.

The time suitable for providing sufficient swelling of the plant material being selected in order to obtain a structure which is sufficiently permeable and allowing passage of liquids and dissolved substances. In a preferred embodiment according to the present invention time the plant material is allowed to swell in the aqueous solution, depending on the type and state of the pectin-containing plant material, from 1 to 120 minutes to obtain sufficient swelling and salt saturation of the pectin-containing plant material. In an other embodiment the time selected is from 1-100 minutes, such as from 1-80 minutes, e.g. from 1-70 minutes, such as from 10-70 minutes, e.g. from 10-60 minutes, such as from 15-40 minutes, e.g. from 20-30 minutes, The time required for obtaining sufficient swelling and salt saturation depends, inter alia, on the physical dimensions of the pectin-containing plant starting material, which may be in the form of particles having an average particle size ranging from 1 mm or less and to parts with a maximum dimension of about 5 mm.

De-Esterification

In the first treatment step, the pectin-containing plant starting material is put into a partly hydrated and swollen state, which is a precondition for the appropriate course of the subsequent treatment step, comprising, according to the invention, that the suspended and swollen pectin-containing plant starting material may be treated with an acidic or an alkaline reagent in order to de-esterify or partly de-esterify the pectin polymer. Preferably, the pectin-containing plant material is treated with an alkaline reagent having a pH ranging from 7-14, such as from 8-14, e.g. from 8-13, such as from 9-13, e.g. from 10-13, such as from 10-12, e.g. from 11.5-12.5. In another embodiment of the present invention the alkaline condition provided in by the addition of an alkaline reagent provides a pH above 7, such as above 8, e.g. above 9, such as above 10, e.g. above 11, such as above 12, e.g. above 13, such as 14.

In the present context the term "de-esterification" relates to a process of removing at least one ester-group from the pectin polymer.

In an embodiment of the present invention the de-esterification treatment is performed at a temperature ranging from about 0° to 120° C., preferably ranging from 0° C. to 50° C., e.g. from 0-20° C., such as form 0-10° C., e.g. from 0-5° C., such as about 3.5° C. In some cases the temperature may even be as low as in the range of −10° C. to 20° C.

In an embodiment of the present invention the de-esterification treatment is performed for from 1 minutes to 120 minutes, such as from 1-100 minutes, such as from 1-80 minutes, e.g. from 1-70 minutes, such as from 10-70 minutes, e.g. from 10-60 minutes, such as from 15-40 minutes, e.g. from 20-120 minutes, such as from 20-30 minutes.

In an embodiment of the present invention the de-esterification treatment is performed with a dry matter content of the plant material in a range from 1-50%, such as from 1%-30% by weight, e.g. from 1%-25% by weight, such as from 1%-15% by weight, e.g. from 1%-10% by weight, typically from 4% to 8% by weight, such as 6% by weight.

In yet an embodiment of the present invention the de-esterification treatment is an alkaline treatment.

In another embodiment of the method of the present invention the alkaline treatment is provided by an alkaline reagent, with which the suspended and swollen plant starting material is treated.

In a further embodiment of the present invention the alkaline reagent, with which the suspended and swollen plant starting material is treated, being selected from the group consisting of ammonia or other low molecular amines, diamines or amino acids, hydroxides of sodium, potassium, and calcium, such as calcium hydroxide, sodium hydroxide, potassium hydroxide, hydroxides of organic bases, such as tetramethylammonium-hydroxide and mixtures thereof. The alkaline reagent may be used in amounts of from 0.5 mmol to 5 mmol of base per gram of pectin-containing plant dry matter.

In yet an embodiment of the present invention the amino acid is selected from the group consisting of lysine, histidine, arginine, glutamine, asparagine and tryptophan.

The alkaline reagent may be used in a solid form or as an aqueous solution and may be added with vigorous stirring to ensure fast distribution in the suspension with the swollen plant starting material.

Preferred alkaline reagents are ammonia, calcium hydroxide and sodium hydroxide. Ammonia is most preferred, but calcium hydroxide may also be preferred because of its limited solubility in water, ensuring a slow release of hydroxide ions.

Most appropriately, the alkaline reagent may be added gradually to the suspension with the swollen plant starting material in such a manner that the pH during the entire reaction process may be maintained at an approximately constant pH ranging from 11.5 to 12.5, e.g. 12.0±0.1. The amount of added alkaline reagent used in such a treatment may be ranging from 20 mmol to 80 mmol, such as from 25 mmol to 50 mmol, of base per kg of reaction mixture.

In a preferred embodiment according to the present invention aqueous ammonia is used as alkaline reagent in an amount of from 20 mmol to 80 mmol of ammonia per gram of pectin-containing plant dry matter, e.g. 40-80 mmol of ammonia per gram of pectin-containing plant dry matter.

Preferably, ammonia may be used in the form of concentrated aqueous ammonia, e.g., as a 25% solution, but lower-strength aqueous ammonia may also be used.

Most appropriately, the aqueous ammonia may be added to the suspension with the swollen plant start material all at once with simultaneous stirring of the suspension. The added amount of ammonia used in the treatment may be ranging from 1 mol to 3.5 mol, such as from 1.4 to 2.7 mol, of ammonia per kg of reaction mixture, ensuring that an approximate constant pH is maintained during the entire reaction process.

In an embodiment of the present invention the treatment with ammonia may be carried out at a temperature ranging from 0° to 120° C., preferably ranging from 0° C. to 50° C., e.g. from 0-20° C., such as form 0-10° C., e.g. from 0-5° C., such as about 3.5° C.

In another embodiment the treatment with ammonia may be carried out for from 1 minutes to 120 minutes, such as from 1-100 minutes, such as from 1-80 minutes, e.g. from 1-70 minutes, such as from 10-70 minutes, e.g. from 10-60 minutes, such as from 15-40 minutes, e.g. from 20-30 minutes, preferably for from about 40 minutes to about 60 minutes.

In an embodiment of the present invention, the pectin-containing plant material is treated with ammonia providing a pH ranging from 7-14, such as from 8-14, e.g. from 8-13, such as from 9-13, e.g. from 10-13, such as from 10-12, e.g. from 11.5-12.5.

During the de-esterification with e.g. ammonia in the aqueous reaction mixture, in which the equilibrium:

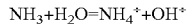

is present, there is a competition between the two nucleophiles ($NH_3$ and $OH^+$), for which reason the de-esterification with $OH^+$, i.e., substitution of $OCH_3$ in the methyl-esterified carboxyl groups in pectin by OH forming COOH, may be accompanied by amidation, in which $OCH_3$ is replaced by $NH_2$ forming carboxamide groups, which, under the de-esterifying conditions, may result in at least 20% and no more than 70%, typically from 25% to 50%, of the methyl-esterified carboxyl groups in pectin being transformed into carboxamide groups.

In the above embodiment of the present invention fibre-containing pectin products with a degree of esterification of at least 3% and no more than 40%, such as no more than 35%, and with a degree of amidation of at least 5%, such as at least 10% and no more than 30%, may be obtained.

Analogous to the degree of esterification, the degree of amidation is defined as the number of carboxamidated galacturonic acid units expressed as a percentage of all galacturonic acid units in the pectin molecule.

In an embodiment of the present invention the treatment with hydroxides of sodium, potassium or calcium, and mixtures thereof is carried out at a temperature ranging from about 0° C. to about 20° C., preferably from about 0° C. to about 5° C., such as from 2° C. to 3° C., for a period of from 20 minutes to 75 minutes, typically from 20 minutes to 45 minutes. This embodiment achieves fibre-containing pectin products with a degree of esterification of from 2% to 40%.

In yet a preferred embodiment of the present invention thus relates to a method of treating pectin-containing plant to obtain fibre-containing pectin products having gel-forming and viscous giving properties, comprising the steps of
(a) suspending a pectin-containing plant starting material and swelling said material for from 10 to 70 minutes and at a temperature ranging from about 0° C. to 20° C. in an aqueous, saline solution, containing at least one added water-soluble and neutral salt selected from the groups consisting of sodium salts, potassium salts and calcium salts, and mixtures thereof in a quantity corresponding to a salt concentration of from 1 mmol to 30 mmol per gram of pectin-containing plant dry matter, to form a suspension in which the content of pectin-containing plant dry matter is ranging from 1% to 10% by weight,
(b) treating the suspended and swollen plant starting material with an alkaline reagent at a pH ranging from 11.5 to 12.5 and at a temperature ranging from about 0° C. to 20° C. for from 5 minutes to 120 minutes, and
(c) separating the treated vegetable material from the reaction mixture and subjecting said material to at least one washing step and then pressing said material to obtain a fibre-containing pectin product, which has a dry matter content of at least 16% by weight, a degree of esterification of from 2% to 40%, and a degree of amidation of no more than 30%, and which is dried to a dry matter content of at least 80% by weight, if desired, and optionally comminuted.

Amidation

In an embodiment of the present invention the plant material may further be subjected to an amidation treatment by subjecting the swollen plant material to an amidation reagent.

In the present context the term "amidation" relates to a process of connecting at least one amine-containing compound to the pectin polymer.

In an embodiment of the present invention the amidation reagent is selected from the group consisting of ammonia or other low molecular amines, diamines or amino acids, such as lysine, histidine, arginine, glutamine, asparagine and tryptophan.

Preferably, the swollen plant material may be treated with the amidation reagent for 1 to 120 minutes, such as from 1-100 minutes, such as from 1-80 minutes, e.g. from 1-70 minutes, such as from 10-70 minutes, e.g. from 10-60 minutes, such as from 15-40 minutes, e.g. from 20-30 minutes, preferably for from about 40 minutes to about 60 minutes.

In an embodiment of the present invention the swollen plant material may be treated with the amidation reagent at a temperature in the range of −10° C. to 120° C., e.g. in the range from −5° C. to 120° C., such as in the range from 0° C. to 120° C., preferably ranging from 0° C. to 50° C., e.g. from 0-20° C., such as form 0-10° C., e.g. from 0-5° C.

In a preferred embodiment of the present invention the steps of de-esterification and amination of the pectin polymer is performed simultaneously or sequentially. One suitable example of simultaneous de-esterification and amidation could be the use of ammonia for both reactions.

Separation, Washing and Pressing

The treated plant material (after being subjected to de-esterification and optionally amidation) may by separated from the e.g. alkaline reaction mixture and subjected to at least one washing step and/or at least one pressed to obtain a fibre-containing pectin product. In an embodiment of the present invention such a fibre-containing pectin product comprises a dry matter content of at least 5% by weight, e.g. at least 10 by weight, such as at least 16% by weight, e.g. at least 20% by weight, such as at least 25% by weight, e.g. at least 50% by weight.

In a further embodiment of the present invention such separated, washed and/or dried fibre-containing pectin product comprises a degree of esterification of from 0-80%, such as from 0-50%, e.g. from 2-50%, such as from 2-45%, e.g. from 2-40%, such as from 5-50%, e.g. from 10-50, such as from 10-40%, e.g. from 15-35%, and/or a degree of amidation of not more that 95% e.g. not more than 75%, such as not more than 60%, not more than 50%, such as not more than 40%, e.g. not more than 30%, such as not more than 25%, e.g. not more than 20%.

In yet an embodiment of the present invention the fibre-containing pectin product obtained may be dried to a dry matter content of at least 40% by weight, such as at least 50% by weight, e.g. at least 60% by weight, such as at least 70% by weight, e.g. at least 80% by weight, such as at least 90% by weight and optionally comminuted.

The separation of the treated plant material from the reaction mixture may be carried out by any appropriate method, such as draining, filtration or centrifugation.

The separated plant material treated with alkaline reagent may be washed at least once by suspending, while stirring, the material in aqueous mineral acid, such as sulphuric acid, hydrochloric acid or nitric acid, so that the pH in the suspension is from 1-6, particularly from 1-4, more particularly from 1-2, most particularly below 1.5 such as from 1.3 to 1.5. Subsequently the washed plant material is separated and may then be washed at least once with water by resuspending it, e.g. in demineralised water. The washing treatment of the product may be carried out at a temperature of e.g. about 15° C. and may be repeated with aqueous acid and water, respectively, until the washing suspension has a stable pH ranging e.g. from 2 to 2.5, whereupon the solid material may be separated from the washing solution and pressed on the filter to reduce the liquid content in the material to a minimum.

By this washing with diluted acid the de-esterification of pectin is stopped by neutralising the alkaline reagent, and salts and water-soluble impurities are washed out so that the pectin in the fibre-containing product is turned into an acidic form.

Instead of immediately separating the treated plant material by draining the alkaline liquid phase off, the reaction mixture with the treated plant material may initially be admixed with diluted mineral acid to a pH ranging from 1-6, particularly from 1-4, more particularly from 1-2, most particularly below 1.5, such as from 1.3 to 1.5. Thus, an immediate neutralisation of the alkaline reagent is achieved, whereupon the treated plant material is separated by draining the liquid phase. The solid material may then be washed by suspension in diluted acid and water e.g. demineralised water, respectively, as discussed above, until the washing suspension has a stable pH ranging from 2 to 2.5.

In a moist state the separated and washed fibre-containing pectin product may optionally be kneaded with bicarbonate salts, such as sodium or potassium bicarbonate bringing the free carboxyl groups in the pectin essentially into a salt form and evaporating carbon dioxide as a gas, whereupon the product is dried and comminuted.

The drying of the washed fibre-containing pectin product may be carried out by means of conventional drying equipment, such as drying oven, belt drier, drum drier or fluid-bed drier for a sufficiently long time to achieve a dry matter content in the material of at least 80% by weight, preferably at least 90% by weight. The drying may be carried out at a temperature ranging from 25° C. to about 100° C. for no more than 36 hours Advantageously, the drying may by carried out at pressures below atmospheric pressure, and thus a relatively lower drying temperature or a relatively shorter drying period may be used, which means a more careful treatment of the product.

The commination of the dried product may also be carried out by grinding with conventional equipment, and thus a comminuted product having a particle size of, less than 1 mm, such as less than 0.5 mm, e.g. less than 0.2 mm can be achieved.

Isolation of Pectin Products

According to the present invention a pectin product may be provided according to the following method:
(i) providing a fibre-containing pectin product according to the present invention,
(ii) adding an extraction medium to the fibre-containing pectin product providing an extraction suspension,
(iii) adjusting the pH of the extraction suspension to a pH in the range of 1-12,
(iv) adjusting the temperature of the extraction suspension to a temperature in the range of 0-120° C., and
(v) isolating the pectin product from the aqueous phase of the extracting medium.

The fibre-containing pectin products obtainable by treating the pectin-containing plant starting material as disclosed hereinabove are also highly suitable starting materials for the production of purified pectin products having surprisingly high gel strengths and viscous giving properties surpassing those of pectin. This is traditionally obtained by de-esterifying acid extracted and purified high-ester pectin having a degree of esterification of about 65% to a degree of esterification of about 50% or less with nitric acid at temperatures of above 50° C.

In this traditional method of preparing low-ester pectins, the further processing to amidated products is often carried out by giving the de-esterified product precipitated in alcohol, and thus first having been subjected to the vigorous acidic action mentioned hereinabove, a final reaction with ammonia. The pectin polymer has thus been acid treated twice for several hours at temperatures above 50° C., which has reduced the molecular weight of the polymer considerably, just as the reaction with ammonia has also contributed adversely, which combination has reduced the gelling and viscous giving properties significantly.

If the fibre-containing pectin products obtainable by the method of the present invention are thus subjected to a treatment involving purification, pectin products with gelling and viscous giving properties, generally surpassing those of corresponding products manufactured in the traditional fashion as mentioned hereinabove, are obtainable.

Accordingly, the present invention further relates to a method of preparing a purified pectin product including the steps consisting of a fibre-containing pectin product obtained by treating a pectin-containing plant material as described hereinbefore. In an embodiment of the present invention the fibre-containing pectin product having a dry matter content of at least 16% by weight, a degree of esterification of from 2% to 40%, and a degree of amidation of no more than 30% being extracted.

Preferably the extraction medium having a pH in the range of 1-12, e.g. in the range of 1-11, such as in the range of 1-10, e.g. in the range of 1-9, such as in the range of 1-7, e.g. in the range of 1-6, such as in the range of 2-6, e.g. in the range of 2-5, such as in the range of 3-5, e.g. in the range of 4-5, such as 4.5.

In an embodiment of the present invention the of the extraction medium may be in the range of 20-120° C., e.g. in the range of 40-100° C., such as in the range of 60-80° C., and a purified pectin product being recovered from the separated aqueous extract.

The fibre-containing pectin product may be extracted for a period of time from 30 minutes to 30 hours, such as from 1 to 20 hours, preferably from 1 to 10 hours, such as for from 1 to 5 hours.

The acidity of the suspension may be adjusted to the desired pH by adding e.g. a strong acid, such as sulphuric acid, or a base, such as sodium hydroxide or ammonium hydroxide.

The extraction may also be carried out by adjusting the pH of the extraction mixture after the heating of the mixture to the desired extraction temperature.

The amount of fibre-containing pectin product and extraction medium during the extraction, carried out while stirring the suspension with the fibre-containing pectin product, may be selected so that the suspension has a dry matter content ranging from 1% by weight to 5% by weight, preferably ranging from 2% by weight to 4% by weight.

Using the amounts of extraction medium mentioned provides an easy-to-stir suspension, and an extract not being too viscous is achieved.

After an appropriate extraction time, the extraction mixture, comprising the fibre-containing pectin product and the extraction medium, may be cooled and the extract may be separated from the insoluble extraction residue, e.g. by filtration or draining. The extraction residue still containing a large amount of extract which is optionally washed with water on the filter or the extraction residue may be slurred in water and filtered again to remove as much of the extract as possible. After separating the washing liquid from the extraction residue, the washing liquid may be combined with the extract.

A purified pectin product can be recovered from the extract by known methods. For example, the product can be precipitated from the extract, which has optionally been concentrated, e.g. by evaporation under reduced pressure, by adding the extract to a water-miscible organic solvent. The organic solvent may be any water-miscible organic solvent in which the pectin product is essentially insoluble. The organic solvent may be, e.g. a monovalent alcohol, such as methanol, ethanol or isopropanol. Mixtures of two or more of such solvents may also be used.

Other suitable methods of isolating the pectin product may be at least one selected from the group consisting of precipitation, extraction, centrifugation, filtration, chromatography, drying and any combination the above mentioned techniques.

When precipitating the product a strong acid or a combination of strong acid and metal ions, such as calcium, may be added to the concentrated extract. Acids that may be used are inorganic acids, such as, e.g. hydrochloric, nitric, sulphuric or phosphorous acids, and mixtures thereof.

The precipitated pectin product is separated from the liquid by, e.g., filtration and pressed, or any one of the above mentioned isolation techniques, and washed on the filter to remove soluble salts and impurities, whereupon the purified pectin product is dried and optionally comminuted.

In a moist state the precipitated pectin product may optionally be kneaded together with a slightly alkaline salt, such as a bicarbonate salt, e.g., sodium or potassium bicarbonate, bringing the free carboxyl groups in the pectin essentially into a salt form and evaporating carbon dioxide as a gas, whereupon the pectin product is dried and comminuted.

The Products

The fibre-containing pectin products obtainable by the method of the present invention consist essentially of soluble and insoluble fibres comprising cellulose, hemicellulose, and lignin apart from pectin. The so-called dietary fibres, i.e. cellulose, hemicellulose, pectin, and lignin, amount to about 60-80% by weight.

In the treatment according to the invention of the pectin-containing plant starting material the pectin polymer has been loosened, but not dissolved, from the cellulose-hemicellulose network and at least partly de-esterified and thereby made functionally accessible to give a fibre-containing pectin product.

Contrary to the pectin-containing plant starting material, the obtained fibre-containing pectin product has gelling and viscosifying properties in the presence of different types of metal ions, e.g., calcium ions. With calcium ions in aqueous solutions, the fibre-containing pectin product obtainable by the method of the invention can form stable gels with surprisingly high gel strengths or viscous solutions with high viscosities.

The gelling and viscous giving properties of the fibre-containing pectin products render the products obtainable by the method of the present invention highly useful in the manufacture of fibre-containing and low-fat foods, such as the use of the pectin products as a general fibre product in various contexts, as a gelling and water-binding ingredient in industrially processed foods, feeds and pet foods, and a diarrhea inhibiting agent or health improving agent to animals and humans.

Thus, the present invention relates to different types of products namely a fibre-containing pectin product obtainable by the above disclosed method, a pectin product obtainable by the above disclosed isolation method and a product as such comprising pectin all having the same special characteristics, such as viscosity, degree of de-esterification, degree of amidation.

In an embodiment of the present invention a fibre-containing pectin product is provided, said product having a degree of esterification of from 2% to 40%, a degree of amidation of no more than 30%, and a dry matter content of at least 16% by weight, and able to form a stable gel or a viscous solution with calcium ions in an aqueous solution containing from 25 to 65% by weight, such as from 25 to 50% by weight of saccharose, such as, e.g., 30% by weight of saccharose, the pH of the solution being in the range of 1-7, such as about 3.

In a preferred embodiment of the present invention the fibre-containing pectin product, the isolated pectin product and/or the product comprising pectin where the pectin polymer has a degree of esterification from 0-80, such as from 0-50, e.g. from 2-50, such as from 2-45, e.g. from 2-40, such as from 5-50, e.g. from 10-50, such as from 10-40, e.g. from 15-35.

In yet a preferred embodiment of the present invention the fibre-containing pectin product, the isolated pectin product and/or the product comprising pectin where the pectin polymer has a degree of amidation of not more that 95% e.g. not more than 75%, such as not more than 60%, not more than 50%, such as not more than 40%, e.g. not more than 30%, such as not more than 25%, e.g. not more than 20%.

In a further embodiment of the present invention the fibre-containing pectin product, the isolated pectin product and/or the product comprising pectin has a dry matter content of at least 1% (w/w) of the dry matter, such as at least 5% (w/w) of the dry matter, e.g. at least 10% (w/w) of the dry matter, such as at least 15% (w/w) of the dry matter, e.g. at least 25% (w/w) of the dry matter, such as at least 50% (w/w) of the dry matter, e.g. at least 75% (w/w) of the dry matter, such as at least 85% (w/w) of the dry matter, e.g. at least 95% (w/w) of the dry matter.

In the present context the term "fibre-containing pectin product" relates to products comprising pectin and fibres. In a preferred embodiment of the present invention the fibre content present in the fibre-containing pectin product is at least 1% (w/w) of the dry matter, such as at least 5% (w/w) of the dry matter, e.g. at least 10% (w/w) of the dry matter, such as at least 15% (w/w) of the dry matter, e.g. at least 25% (w/w) of the dry matter, such as at least 50% (w/w) of the dry matter, e.g. at least 75% (w/w) of the dry matter, such as at least 85% (w/w) of the dry matter, e.g. at least 95% (w/w) of the dry matter.

In the present context the term "pectin product" relates to products obtained by the isolation method described herein. In an embodiment of the present invention the pectin product comprises no or substantially no fibres.

In the present context the term "product comprising pectin" relates compositions, solutions or other kind of mixtures where the pectin polymer constitute from 1-100% of the product by weight, such as from 1-50%, e.g. 1-25%, such as 1-10%, e.g. 10-100%, such as 25-75%, e.g. 50-75%.

In an embodiment of the present invention the pectin present, in either the fibre-containing pectin product, the isolated pectin product and/or the product comprising pectin, has a degree of esterification from 0-80, such as from 0-50, e.g. from 2-50, such as from 2-45, e.g. from 2-40, such as from 5-50, e.g. from 10-50 and/or a degree of amidation of not more that 95% e.g. not more than 75%, such as not more than 60%, not more than 50%, such as not more than 40%, e.g. not more than 30%, such as not more than 25%, e.g. not more than 20%.

A characteristic feature of the products according to the present invention is the increased molecular size of the pectin polymers compared to the conventionally provided pectin polymers. This difference between the two types of polymers may be expressed in term of the viscous giving properties of the products.

In order to easily evaluate pectin products in respect of their viscosity the following Method A has been provided.

Method A:

A beaker of 200 ml with a magnetic stirrer is tarred.

1.000 grams of the pectin material is transferred to the beaker and 3 ml of isopropanol (IPA) is added under magnetic stirring. When the suspension is homogeneous 100 ml of boiling citrate buffer (se below) is added under stirring. After total dissolution of the polymer 250 mg sodium hexametaphosphate is added. The solution is stirred for two hours and weighted up to 100.0 grams. When the temperature is 20.0° C. the flow curve is determined at shear rates from 15-150 1/sec at a Haake Rheostress 1 (se below).

Citric acid/citrate buffer:

A: 21.02 gram citric acid, monohydrate pr. liter ion exchanged water.

B: 29.41 gram trisodium citrate, dihydrate pr. liter ion exchanged water.

17 parts of A and 33 parts of B were mixed to give the final solution.

Hake Rheostress 1:

Sensor system rotor Z34 DIN 53019 Serie 1.

Water bath thermosetting was 20.0° C. heating the measuring cup.

Thus, in a preferred embodiment of the present invention a product obtainable by the methods described herein or a product comprising pectin is provided, wherein said product fulfils at least one of following requirements:

(i) the product has a viscosity of at least 5 cp when mixed in a concentration of at the most 1% (w/w) of pectin in a solution and measured by method A, or (ii) the product has a viscosity which is at least 2 times higher than the viscosity of conventional manufactured pectin products when mixed in a concentration of at the most 1% (w/w) of pectin in a solution and measured by method A.

In yet an embodiment of the present invention the product has a viscosity of at least 5 cp (centipoise) when mixed in a concentration of at the most 1% (w/w) of pectin in a solution, such as at least 10 cp, e.g. at least 15 cp, such as at least 20 cp, e.g. at least 25 cp, such as at least 35 cp, e.g. at least 40 cp, such as at least 45 cp, e.g. at least 50 cp, such as at least 75 cp, e.g. at least 100 cp, such as at least 150 cp, e.g. at least 200 cp. In a further embodiment of the present invention the product has a viscosity which is at least 2.5 times higher than conventional used pectin products, such as at least 3 times higher, e.g. at least 3.5 times higher, such as at least 4 times higher, e.g. at least 5 times higher.

Technical Applications

The fibre-containing pectin products, and pectin products obtainable by treatments as disclosed hereinabove has technical properties immediately allowing technical applications with various fields. The unsurpassed gel strength, viscosifying and emulsifying properties of the product make it suitable for, e.g. encapsulation of, e.g., easily volatile lipid and/or water-soluble aromatic and colouring agents. A property that can be used in the production of foods and feeds, as well as within the pharmaceutical and cosmetic industries, e.g., by encapsulating micronutrients, flavouring agents, vitamins, etc. The pectin products of the present invention are thus useful in the production of solid and liquid pharmaceutical compositions, including, e.g., tablets, suspensions, emulsions, etc. and as components in cosmetic products, such as perfumes, creams, and lotions, etc.

Under certain production conditions, the product of the invention generates a protective film around the agent(s) desirably to be protected from, e.g., oxygen, light, heat, etc. Alternatively, the agent desirably to be protected may be embedded in an encapsulation gel based on the present product.

Furthermore, the product may be applicable as a structuring agent by direct addition and/or by restructuring of components in foods and feeds. In feeds, e.g., by the restructuring of residual meat as chunks, as a viscosifying agent in gravies, gel-forming agents together with meat and bone meal, and as a structuring component in dry feed products under low-pressure extrusions. Furthermore, the addition of the product will increase the autoclave stability of the feed products and the vigorous emulsifying effect may prevent fat leakage during autoclave treatment.

In foods the pectin products of the invention may advantageously be used as a natural fat replacement component in so-called "light" products. A particularly advantageous aspect of such an application is that the pronounced emulsifying effect of the pectin products enables the omission of conventional emulsifiers.

A particular utilization of the technical properties characterizing the pectin products of the invention is to use them in tobacco products, e.g., as a partial replacement for tobacco or as a technical aid when processing tobacco leaves. Moreover, the addition of pectin products of the invention to tobacco products will be directly structuring and/or will be useable when restructuring the tobacco products. Pectin products of the invention are easily suspended in water in high concentrations and may, depending on the activation degree of the product, be handled as a high viscous and sticky solution with high dry matter percentage. For the same reason, tobacco material may be restructured and stuck together by infusion of such a suspension prior to drying. The presence of a pectin product in the finished tobacco products has a water-binding effect and thus prevents drying to an unacceptable level. Any other tobacco ingredients may be dissolved, or form salt in the polymer mixture, and be mixed with the "activated" pectin product. It should be noted that the above aroma-protecting properties, which are characteristic of pectin products of the invention, may also be applied for protecting aroma and flavour components in tobacco.

Furthermore, the pectin-containing products of the invention may be used as skin-friendly components in diapers, tissues, sanitary napkins, etc.

In yet an embodiment the present invention relates to the use of the treated pectin containing plant start material in the manufacture of pectin, in the manufacture of animal feed and for use in foodstuffs.

In a further embodiment the present invention also relates to the use of said pectin. Uses include foodstuffs, cosmetic products, pharmaceutical products and household products.

The pectin according to the present invention is particularly useful for making jams and jellies, for bakery products including jams and dough, whether laminated or not, acidified protein beverages, wound care preparations, ostomy products etc.

In an embodiment of the present invention the fibre-containing pectin product, the pectin and/or the product comprising pectin may be used for the encapsulation of, e.g., easily volatile lipid and/or water-soluble aromatic and colouring agents or by encapsulating micronutrients, flavouring agents, vitamins, etc. or in the production of solid and liquid pharmaceutical compositions, including, e.g., tablets, suspensions, emulsions, etc. and as components in cosmetic products, such as perfumes, creams, and lotions, etc or as a viscosifying agent and/or an emulsifying agent or for fat replacement or for the replacement of tobacco.

In a further embodiment of the present invention the pectin polymers provided may also provide a suitable delivering system for drug delivery because of the coupling provided between the ester group of the pectin molecule and the drug or compound to be delivered.

The following non-limiting figures and drawings will further describe the present invention.

FIG. 1: shows the difference in viscosity (cp: centipoise) between a citrus pectin product according to the present invention (triangles) compared to a conventional citrus pectin product (squares).

EXAMPLES

Material and Methods

Determination of Degree of Esterification (DE), Degree of Amidation (DA), Degree of Acetylation (DAc), and Anhydrogalacturonic Acid (AGA)

% DE, % DA, % DAc, and total anhydrogalacturonic acid (% AGA) were determined in accordance with the methods described in Food Chemical Codex, Fourth Edition, National Academic Press, Washington 1996, page 283.

Determination of Gel Strength

The gel strength (expressed in grams) was obtained at about 20° C. on an aqueous calcium saccharose gel (pH=about 3±0.1) with a solid saccharose content of 30% by weight and increasing content of calcium by a "Texture Analyser" (Stable Micro Systems, model TA-XT2i) using the following parameters:

Press cylinder piston (SMS P/O 5R): 5 mm diameter

Distance: 4 mm

Rate: 0.5 mm/sec.

The gels were made in the following manner:

An amount (3-4 g) of fibre-containing pectin product corresponding to 1.2 g of pectin, or 1.2 g of purified pectin product, was slurried in 110.5 g of demineralised water containing 0.100 g of sodium hexametaphosphate. By adding concentrated aqueous ammonia (25%) dropwise with vigorous stirring by an Ultra Turrax stirrer (UT), the pH was adjusted to 4.5. The mixture was heated to 70-80° C. in microwave oven and UT-treated once more, whereupon 60 g of saccharose was added and dissolved in the warm mixture under UT-stirring.

Calcium hydrogen phosphate ($CaHPO_4.2H_2O$) was weighed in the tip of a weighing boat and transferred quantitatively with 2×5 ml of demineralised water to the hot polymer mixture under UT-stirring. 2.2 g of gluconodeltalactone ($C_6H_{10}O_6$) was dissolved in 12.5 ml of cold demineralised water and similarly transferred quantitatively with 2.5 ml of demineralised water to the hot polymer mixture containing the finely divided slightly soluble calcium hydrogen phosphate. Following UT-stirring of the hot mixture, the mixture now having a weight of 200 g was deposited in flat tape wrapped dishes (diameter: 60 mm; height: 15 mm). Upon cooling at room temperature (about 20° C.) until the next day, a gel had been formed. The tape was removed and excess gel was cut off with cheese cutting blade.

Example 1

50 g of dried and shredded lime peels (% AGA: 40.6; % DE: 71.8) having a maximum dimension of 5 mm and a dry matter content of 88% by weight was suspended in 550 g of an aqueous solution containing 11.25 g of sodium chloride and 4.125 g of calcium chloride ($CaCl_2.2H_2O$), corresponding to 4.375 mmol of sodium chloride and 0.6488 mmol of calcium chloride, respectively, per gram of plant dry matter.

The suspension was stirred for 70 minutes at a temperature of 17° C., whereupon the temperature was reduced to 6.5° C., and 150 g of concentrated aqueous ammonia (25%), corresponding to 2.22 mol or 50.45 mmol per gram of plant dry matter, was added while stirring. The amount of added ammonia was 2.96 mol per kg of reaction mixture and the pH was 11.8 in the reaction mixture.

With slow stirring, the suspension was maintained at 6.5° C. The suspension was easy to stir and the peel material was divided into a strongly yellow-coloured and non-viscous liquid phase.

After 40 minutes of stirring, the liquid phase was drained off through a filter cloth. The solid material was squeezed/wrung to remove as much liquid as possible. The solid material was washed several times by suspending the material in diluted sulphuric acid (600 ml) until a stable pH of from 2.2 to 2.5 in the suspension was obtained. After each washing step the liquid was drained off. After having drained off the liquid following the final washing step through the filter cloth, the solid material was squeezed/wrung to remove as much liquid as possible.

The moist material (dry matter content about 25% by weight) was dried overnight in a drying oven at 40° C. The dried product was comminuted into a fine powder having a particle size of less than 0.2 mm. The yield of fibre-containing pectin product was 42 g with a dry matter content of 89.8% by weight. The analytical characteristics of the product are shown in Table 1. With calcium ions the product formed stable gels. The gel strengths of gels with 233, 466, and 699 ppm of calcium, respectively, are shown in Table 2

TABLE 1

Analytical characteristics of fibre-containing pectin product

| | |
|---|---|
| Anhydrogalacturonic acid (% AGA)* | 47.7 |
| Degree of esterification (% DE) | 12.1 |
| Degree of amidation (% DA) | 28.2 |
| Dietary fibres* | 85.3 |

*percentage by weight of dry matter

TABLE 2

| Calcium conc. (ppm) in gel | Gel strength in grams |
|---|---|
| 117 | Not determined |
| 233 | 629 |
| 466 | 711 |
| 699 | 898 |

The ammonia containing solution, which had been drained off, was poured into the double volume of isopropanol (100%). Precipitation of polymer material was not observed expressing that the treatment of the lime peels with ammonia in the presence of salt had not resulted in solubilization and extraction of pectin.

For comparison, 50 g of dried lime peels was treated in the same way as described above, except that sodium chloride and calcium chloride were not added. During the treatment with ammonia the reaction mixture became more and more viscous and finally appeared as a high-viscous and lumpy mixture being difficult to handle. Separating the solid material from the liquid part was a time-consuming operation (about 30 minutes).

Upon washing with diluted sulphuric acid, drying and grinding of the separated material, 37 g with a dry matter content of 90.1% by weight was obtained.

The ammonia containing solution was poured into isopropanol (100%), resulting in the precipitation of a voluminous polymer material. Following separation and drying of the precipitated material, 12 g with a dry matter content of 95.7% by weight was obtained.

Examples 2-7

In Examples 2-7 50 g of dried and shredded (maximum dimension: 5 mm) lime peels (% AGA: 40.6; % DE: 71.8) with a dry matter content of 88% by weight was treated as described in Example 1, except that swelling time, swelling temperature, de-esterification temperature, de-esterification time or salt concentration was changed compared to Example 1. In all the Examples the content of vegetable dry matter in the salt solution was 7.33% by weight, and the treatment with aqueous ammonia was carried out with a quantity of ammonia of 50.5 mmol of ammonia per gram of plant dry matter. The quantity of added ammonia was 2.96 mol of ammonia per kg of reaction mixture.

The fibre-containing pectin products were isolated as described in Example 1 and analysed for the degree of esterification and degree of amidation. Reaction parameters as well as % DE and % DA are shown in Table 3.

TABLE 3

| Example | Swelling Min. | Swelling °C. | De-esterification Min. | De-esterification °C. | Salt conc. mmol/g dry matter Na | Salt conc. mmol/g dry matter Ca | % DE | % DA |
|---|---|---|---|---|---|---|---|---|
| 2 | 30 | 3.5 | 40 | 3.5 | 0 | 0.6376 | 23.8 | 26.1 |
| 3 | 70 | 3.5 | 30 | 3.5 | 0 | 0.6376 | 26.7 | 23.5 |
| 4 | 10 | 3.5 | 30 | 3.5 | 4.375 | 0 | 33.3 | 20.8 |
| 5 | 30 | 3.5 | 20 | 3.5 | 4.375 | 0.6376 | 35.0 | 17.3 |
| 6 | 10 | 3.5 | 40 | 3.5 | 29.165 | 0.6376 | 30.7 | 15.9 |
| 7 | 10 | 3.5 | 40 | 3.5 | 29.165 | 0 | 29.5 | 17.8 |

Example 8

937.5 of potato pulp (% AGA in dried pulp: 17.0; % DE: 56.9; % DAc: 17.4) in the form of particles having a size of ≦0.5 mm and with a dry matter content of 18% by weight was suspended in about 3075 g of an aqueous solution containing 66.9 g (1.1447 mol) of sodium chloride and 24.54 g (0.1669 mol) of calcium chloride corresponding to 7.6313 mmol of sodium chloride and 1.1126 mmol of calcium chloride, respectively, per gram of plant dry matter. The weight of the suspension was 4013.6 g.

Under vigorous stirring, the suspension was adjusted to pH=7 with ammonia water and stirring was continued for 70 minutes at a temperature of about 20° C., whereupon 445.9 g of concentrated aqueous ammonia (25%), corresponding to 6.609 mol or 44.06 mmol per gram of plant dry matter, was added. The amount of added ammonia was 1.482 mol per kg of reaction mixture. During the entire reaction process the pH was about 12.

Under continued stirring the suspension was maintained at about 20° C. The suspension was easy to stir and the liquid phase was easily flowable and low-viscous. After 30 minutes of stirring, the liquid phase was drained off through a filter cloth. The solid material was squeezed/wrung to remove as much liquid as possible and then suspended in 5 liters of demineralised water containing 200 ml of 20% sulphuric acid solution. The solid material was re-isolated by draining off the liquid. Following another two treatments with 5 liters of demineralised water, the pH of the suspension was =2.2. After having drained off the liquid following the final washing step through the filter cloth, the solid pulp material was squeezed/wrung to remove as much liquid as possible.

The moist product (dry matter content about 25% by weight) was dried overnight in a drying oven at 40° C. The dried product was ground (Fritsch mill) to a fine powder having a particle size of less than 0.2 mm. The yield of fibre-containing pectin product was 120 g with a dry matter content of 93.0% by weight. The analytical characteristics of the product are shown in Table 4. With calcium ions the product formed stable gels. The gel strengths of gels with 233, 466, and 699 ppm of calcium, respectively, are shown in Table 5.

TABLE 4

Analytical characteristics of fibre-containing pectin product

| | |
|---|---|
| Anhydrogalacturonic acid (% AGA)* | 17.8 |
| Degree of esterification (% DE) | 8.6 |
| Degree of amidation (% DA) | 10.3 |

TABLE 4-continued

Analytical characteristics of fibre-containing pectin product

| Degree of acetylation (% DAc) | 5.6 |
|---|---|
| Dietary fibres* | 68.5 |

*percentage by weight of dry matter

TABLE 5

| Calcium conc. (ppm) in gel | Gel strength in grams |
|---|---|
| 117 | No gel structure |
| 233 | 73 |
| 466 | 124 |
| 699 | 145 |

The ammonia containing solution, which had been drained off, was poured into the double volume of isopropanol (100%). Precipitation of polymer material was not observed, expressing that the treatment of the potato pulp with ammonia in the presence of salts had not resulted in solubilization and extraction of pectin.

As in Example 1, the same amount of potato pulp was treated in the same way as described above, but without added sodium chloride and calcium chloride. During the treatment with ammonia the suspension was very viscous and difficult to stir. It took more than 30 minutes to separate partly solid pulp material off from the liquid ammoniacal phase.

1234 g of the liquid ammoniacal phase was poured into isopropanol resulting in the precipitation of a voluminous polymer material. After separation and drying of the precipitated material, 16.3 g with a dry matter content of 90.4% by weight was obtained.

800 g of partly solid pulp material was washed with diluted sulphuric acid solution, dried and ground to give 56.7 g with a dry matter content of 90.7% by weight.

Examples 9-14

In Examples 9-14 130.81 g of potato pulp (% AGA in dried pulp: 17.0; % DE: 56.9; % DAc: 17.4) with a dry matter content of 18% by weight and particle size ≦0.5 mm was treated as described in Example 2, except that de-esterification temperature, de-esterification time, salt concentration or ammonia concentration was changed compared to Example 2.

In all Examples the content of vegetable dry matter in the salt solution was 4.11% by weight and the pulp material was swollen for 10 minutes at 3.5° C. prior to the treatment with aqueous ammonia.

The fibre-containing pectin products were isolated as described in Example 2 and analysed for % DE and % DA. Reaction parameters as well as % DE and % DA are shown in Table 6.

TABLE 6

| Exam-ple | De-esterification | | Salt conc. mmol/g dry matter | | NH₃ - amount mmol/g dry matter | mol/kg* | % DE | % DA |
|---|---|---|---|---|---|---|---|---|
| | Min. | °C. | Na | Ca | | | | |
| 9 | 120 | 20 | 13.207 | 0 | 80 | 2.69 | 4.8 | 26.6 |
| 10 | 30 | 3.5 | 0 | 1.112 | 44 | 1.50 | 16.5 | 23.0 |
| 11 | 30 | 3.5 | 7.629 | 0 | 44 | 1.50 | 22.1 | 23.2 |
| 12 | 60 | 3.5 | 7.629 | 1.112 | 44 | 1.50 | 10.1 | 24.2 |
| 13 | 30 | 3.5 | 7.629 | 1.112 | 44 | 1.50 | 14.5 | 23.3 |
| 14 | 60 | 20 | 13.207 | 0 | 80 | 2.69 | 5.64 | 26.06 |

*reaction mixture

Example 15

200 g of minced and dried orange peels (% AGA: 41.5; % DE: 70.7) of Moroccan oranges with a dry matter content of 85% by weight was suspended in about 2379 g of an aqueous solution containing 45.0 g (0.7700 mol) of sodium chloride and 16.5 g (0.1122 mol) of calcium chloride (CaCl$_2$.2H$_2$O). The suspension (2640 g) was stirred for 30 minutes at a temperature of about 15° C., whereupon the temperature was reduced to 3-4° C., and 360 g of concentrated aqueous ammonia (25%), corresponding to 5.336 mol, was added while stirring. The amount of ammonia was 2.02 mol per kg of reaction mixture.

While stirring, the suspension was maintained at a temperature of 3-4° C. for 30 minutes. The suspension was easy to stir and the peel material was distributed in a non-viscous liquid phase.

After 30 minutes of stirring, the liquid phase was drained off through a filter cloth. The solid material was squeezed/wrung to remove as much liquid as possible and then washed with diluted sulphuric acid as described in Example 1. The analytical characteristics of the product are shown in Table 7. The product formed stable gels with calcium ions. The gel strengths of gels with 117, 233, 466, and 699 ppm of calcium, respectively, are shown in Table 8.

TABLE 7

| Analytical characteristics | |
|---|---|
| Anhydrogalacturonic acid (% AGA)* | 44.2 |
| Degree of esterification (% DE) | 29.4 |
| Degree of amidation (% DA) | 17.5 |

*percentage by weight of dry matter

TABLE 8

| Calcium conc. (ppm) in gel | Gel strength in grams |
|---|---|
| 117 | 87 |
| 233 | 295 |
| 466 | 365 |
| 699 | 457 |

The moist fibre-containing pectin product amounting to 900 g with a dry matter content of 16.1% by weight was suspended in 9000 ml of demineralised water and the pH was adjusted to 4.5 with 12.1 g of concentrated aqueous ammonia (25%). While stirring, the suspension was heated and left at 75° C. under constant stirring for 60 minutes, whereupon the extract was separated from an insoluble extraction residue by filtration through filter earth.

The filtrate was poured into the double volume of isopropanol (100%), whereby the pectin product precipitated. Following separation of the precipitated and purified pectin product as well as washing and drying at 40° C., 37.3 g with a dry matter content of 92.9% by weight was obtained. The product was ground to a fine powder having a particle size of less than 2 mm. The analytical characteristics of the purified pectin product are shown in Table 9. With calcium Ions the product formed stable gels. The gel strengths of gels with 117, 233, 466, and 699 ppm of calcium, respectively, are shown in Table 10.

TABLE 9

Analytical characteristics of purified pectin product

| | |
|---|---|
| Anhydrogalacturonic acid (% AGA)* | 80.7 |
| Degree of esterification (% DE) | 24.3 |
| Degree of amidation (% DA) | 18.1 |
| Degree of acetylation (% Dac) | 0 |

*percentage by weight of dry matter

TABLE 10

| Calcium conc. (ppm) in gel | Gel strength in grams |
|---|---|
| 117 | 104 |
| 233 | 489 |
| 466 | 661 |
| 699 | 675 |

Example 16

2812.5 g of humid potato pulp with a dry matter content of 14% by weight was suspended in about 9200 g of an aqueous solution containing 200 g (3.4223 mol) of sodium chloride and 73.6 g (0.5006 mol) of calcium chloride (CaCl2.2H2O) corresponding to 8.69 mmol of sodium chloride and 1.27 mmol of calcium chloride, respectively, per gram of plant dry matter. The weight of the suspension was 12041 g.

After stirring the suspension for 10 minutes at 19° C., 1337.8 g of concentrated aqueous ammonia (25%) corresponding to 19.829 mol or 50.36 mmol per gram of plant dry matter was added. The amount of ammonia added was 1.482 mol per kg of reaction mixture.

The mixture was stirred for 30 minutes at 19° C., whereupon the liquid phase was drained off through a filter cloth. The solid material was squeezed/wrung to remove as much liquid as possible, whereupon the solid material was suspended in 15 l of demineralised water, while stirring, and the pH adjusted to about 1.3 with a 20% sulphuric acid solution (1200 ml). The solid material was separated again by draining off the washing solution through filter cloth and suspended in 15 l of demineralised water, while stirring. This washing procedure was repeated twice. After the final washing, the pH in the washing water was 2.5.

After draining off the final washing water through filter cloth and squeezing/wringing of the separated solid fibre-containing pectin product, this amounted to 1785 g. The dry matter content was 18.6% by weight.

A part of the moist fibre-containing pectin product was dried at 60° C. overnight and ground (Fritsch mill) to a fine powder having a particle size of less than 0.2 mm. The analytical characteristics of the dried fibre-containing pectin product are shown in Table 11. The product formed stable gels with calcium ions. The gel strengths of gels with 117, 233, 466, and 699 ppm of calcium, respectively, are shown in Table 12.

TABLE 11

Analytical characteristics of fibre-containing pectin product

| | |
|---|---|
| Anhydrogalacturonic acid (% AGA)* | 16.2 |
| Degree of esterification (% DE) | 3.0 |
| Degree of amidation (% DA) | 12.8 |
| Degree of acetylation (% DAc) | 8.0 |

*percentage by weight of dry matter

TABLE 12

| Calcium conc. (ppm) in gel | Gel strength in grams |
|---|---|
| 117 | 58 |
| 233 | 175 |
| 466 | 231 |
| 699 | 168 |

Example 17

893 g of moist fibre-containing pectin product (dry matter content 18.6% by weight) from Example 16 was suspended in 8640 g of demineralised water with vigorous stirring and the pH was adjusted to 4.5 by adding concentrated aqueous ammonia (25%).

While stirring, the suspension was heated and was left with stirring at 75° C. for 30 minutes, whereupon the liquid phase (the extract) was separated from an insoluble extraction residue by filtration through a filter cloth. The hot insoluble extraction residue was squeezed to expel as much extract as possible. The extracted pectin product was precipitated by pouring the cooled extract (6800 ml) into the same volume of isopropanol containing 1233 g of sulphuric acid solution (15.6%). The pectin product was isolated on filter cloth, squeezed vigorously and washed twice by suspending it in 800 ml of isopropanol with vigorous stirring. After filtration on filter cloth and pressing, the purified pectin product was dried at 40° C. overnight. The yield of purified pectin product was 31 g with a dry matter content of 93% by weight. The analytical characteristics of the purified pectin product are shown in Table 13. With calcium ions the product formed stable gels. The gel strengths of gels with 117, 233, 466, and 699 ppm of calcium, respectively, are shown in Table 14.

TABLE 13

Analytical characteristics of purified pectin product

| | |
|---|---|
| Anhydrogalacturonic acid (% AGA)* | 31.3 |
| Degree of esterification (% DE) | about 3 |
| Degree of amidation (% DA) | 11.5 |
| Degree of acetylation (% DAc) | 2.2 |

*percentage by weight of dry matter

TABLE 14

| Calcium conc. (ppm) in gel | Gel strength in grams |
|---|---|
| 117 | 103 |
| 233 | 257 |
| 466 | 304 |
| 699 | 308 |

Example 18

Sugar beet slices, which had been frozen at −20° C., were thawed and minced in a high-speed mincer to a particle size ≦5 mm. 366.7 g (% AGA in dried pulp: 23.9; % DE: 42.7; % DAc: 15.2) with a dry matter content of 11% by weight was suspended, with stirring, in about 1200 g of an aqueous solution (about 2° C.) containing 26.17 g of sodium chloride and 9.60 g of calcium chloride ($CaCl_2.2H_2O$) corresponding to 11.101 mmol of sodium chloride and 1.619 mmol of calcium chloride, respectively, per gram of plant dry matter. The weight of the suspension was 1571 g.

The suspension was stirred for 20 minutes at a temperature of about 20° C., whereupon 174.4 g of concentrated aqueous ammonia (25%) corresponding to 2.585 mol or 64.08 mmol per gram of plant dry matter was added. The amount of ammonia added was 1.482 mol per kg of reaction mixture.

After stirring the mixture for 60 minutes at about 20° C. and a pH of about 12, the liquid phase was drained off through a filter cloth, and the solid material was squeezed/wrung to remove as much liquid as possible, whereupon the solid material was suspended in demineralised water and the pH adjusted to 1.3 with diluted sulphuric acid. The solid material was separated again by draining off the liquid through filter cloth and suspended in demineralised water under stirring. With diluted sulphuric acid the pH was set at 1.3.

After separation of the solid material, this was washed by suspending it in demineralised water. The washed material was separated by draining off the washing water through filter cloth, squeezed/wrung to remove as much liquid as possible and dried at 40° C. overnight in a drying oven. The dried material was ground to a fine powder having a particle size of less than 0.2 mm. The yield of fibre-containing pectin product was 29.81 g with a dry matter content of 92.9% by weight. The analytical characteristics of the product are shown in Table 17.

The pectin product formed stable gels with calcium. The gel strengths of gels with 233, 466, and 699 ppm of calcium, respectively, are shown in Table 15.

TABLE 15

| Calcium conc. (ppm) in gel | Gel strength in grams |
| --- | --- |
| 233 | 17.5 |
| 466 | 51.0 |
| 699 | 67.2 |

Example 19

366.7 g of minced sugar beet slices (same grade as used in Example 18) was treated as described in Example 18, except that the treatment time with ammonia was 30 minutes.

The yield of fibre-containing pectin product was 30.0 g with a dry matter content of 92.3% by weight. The analytical characteristics of the product are shown in Table 17.

The fibre-containing pectin product formed viscous solutions at 20° C. with calcium ions in aqueous solutions containing 30% by weight of saccharose and with a pH of 3.5. The solutions were prepared as described for the determination of gel strength. The viscosities of solutions containing 233, 466, and 699 ppm of calcium, respectively, were measured with a Haake Rheometer (Rheostress, Sensor System Z34, DIN 53019, series 1). The results are shown in Table 16.

TABLE 16

| | Viscosity (mPa · s) at | | |
| --- | --- | --- | --- |
| Shear rate ($s^{+1}$) | 233 ppm Ca | 466 ppm Ca | 699 ppm Ca |
| 15 | 277.0 | 1325 | 1691 |
| 30 | 176.5 | 710.3 | 814.7 |
| 60 | 119.6 | 300.3 | 436.3 |
| 90 | 97.1 | 187.8 | 250.3 |
| 120 | 83.9 | 141.5 | 183.9 |
| 150 | 75.9 | 121.7 | 183.9 |

TABLE 17

| Analytical characteristics of fibre-containing pectin product from sugar beet slices | Example 18 | Example 19 |
| --- | --- | --- |
| Anhydrogalacturonic acid (% AGA)* | 26.1 | 24.8 |
| Degree of esterification (% DE) | 12.2 | 15.7 |
| Degree of amidation (% DA) | 16.2 | 13.7 |
| Degree of acetylation (% DAc) | 6.3 | 10.7 |

*percentage by weight of dry matter

Example 20

100 g of dried and shredded lime peels (% AGA: 40.6; % DE: 71.8) having a maximum particle size of 5 mm and a dry matter content of 88% by weight was suspended in about 1280 g of an aqueous solution (3° C.) containing 22.5 g of sodium chloride and 8.25 g of calcium chloride ($CaCl_2.2H_2O$) corresponding to 4.375 mmol of sodium chloride and 0.6378 mmol of calcium chloride, respectively, per gram of plant dry matter. The weight of the suspension was 1378.5 g.

The suspension was stirred for 30 minutes at a temperature of 3° C., whereupon 4.75 g of pulverized calcium hydroxide ($Ca(OH)_2$), corresponding to 64.11 mmol or 0.728 mmol of calcium per gram of plant dry matter, was added gradually with vigorous stirring and maintained at pH=12.0±0.1. The amount of calcium hydroxide added was 46.35 mmol per kg of reaction mixture. The mixture was stirred for 35 minutes at a temperature of 3° C., whereupon diluted sulphuric acid was added to pH=1.3.

The liquid phase was drained off through a filter cloth and the solid material squeezed/wrung to remove as much liquid as possible, whereupon the solid material was suspended in demineralised water and the pH adjusted to 1.3 with diluted sulphuric acid.

After draining off the liquid phase through filter cloth and squeezing/wringing of the solid material, the solid material was finally washed by suspending it in demineralised water.

After draining off the liquid phase through a filter cloth, the solid material was oven dried at a temperature of 40° C. overnight. The dried product was ground to a fine powder having a particle size ≦0.2 mm. The yield of fibre-containing pectin product was 87.3 g with a dry matter content of 92.8% by weight. The analytical characteristics of the product are shown in Table 18.

The product formed stable gels with calcium. The gel strengths measured are shown in Table 19.

Example 21

100 g of dried and shredded lime peels (same grade as used in Example 20) was treated as described in Example 20, except that 215.8 g of 0.5 N sodium hydroxide (107.9 mmol), corresponding to 1.226 mmol of sodium per gram of plant dry matter, was used instead of 4.75 g of calcium hydroxide. The amount of added sodium hydroxide was 76.69 mmol per kg of reaction mixture.

The yield of fibre-containing pectin product was 85.5 g with a dry matter content of 98.3% by weight. The analytical characteristics of the product are shown in Table 18 and in Table 19 the gel strengths of gels containing 233, 466, and 699 ppm of calcium, respectively, are shown.

TABLE 18

| Analytical characteristics of fibre-containing pectin product from lime peels | Example 20 | Example 21 |
|---|---|---|
| Anhydrogalacturonic acid (% AGA)* | 44.8 | 40.6 |
| Degree of esterification (% DE) | 38.4 | 38.7 |
| Degree of acetylation (% DAc) | — | — |

*percentage by weight of dry matter

TABLE 19

| Calcium conc. | Gel strength in grams | |
|---|---|---|
| (ppm) in gel | Example 20 | Example 21 |
| 233 | 206 | 244 |
| 466 | 251 | 335 |
| 699 | 482 | 438 |

Example 22

100 g of dried and shredded lemon peels (% AGA: 41.7; % DE: 74.3) with a maximum particle size of 5 mm and a dry matter content of 91% by weight was suspended, under stirring, in about 1280 g of an aqueous solution (2.5° C.) containing 22.5 g of sodium chloride and 8.25 g of calcium chloride ($CaCl_2.2H_2O$) corresponding to 4.231 mmol of sodium chloride and 0.6167 mmol of calcium chloride, respectively, per gram of plant dry matter. The weight of the suspension was 1378.5 g.

The suspension was stirred for 30 minutes at a temperature of 2.5° C., whereupon 4.69 g of pulverized calcium hydroxide ($Ca(OH)_2$), corresponding to 63.30 mmol or 0.695 mmol of calcium per gram of plant dry matter, was added gradually with vigorous stirring and maintained at pH=12±0.1. The amount of calcium hydroxide added was 45.77 mmol per kg of reaction mixture. The reaction mixture was stirred for 35 minutes at a temperature of 2.5° C., whereupon diluted sulphuric acid was added until pH=1.3.

The fibre-containing pectin product was processed and isolated as described in Example 20. The yield was 80.0 g with a dry matter content of 92.3% by weight. The analytical characteristics of the product are shown in Table 20.

The pectin product formed stable gels with calcium ions. The gel strengths of gels with 233, 466, and 699 ppm of calcium, respectively, are shown in Table 21.

Example 23

100 g of dried and shredded lemon peels (same grade as used in Example 22) was treated as described in Example 22, with the difference that the swelling of the shell material was carried out at a temperature of 20° C. and the treatment with calcium hydroxide was carried out at a temperature of 20° C. for 26 minutes.

The yield of fibre-containing pectin product was 78.0 g with a dry matter content of 92.6% by weight. The analytical characteristics of the product are shown in Table 20.

The product formed stable gels with calcium ions. The gel strengths of gels with 233, 466, and 699 ppm of calcium, respectively, are shown in Table 21.

TABLE 20

| Analytical characteristics of fibre-containing pectin product from lemon peels | Example 22 | Example 23 |
|---|---|---|
| Anhydrogalacturonic acid (% AGA)* | 41.6 | 41.2 |
| Degree of esterification (% DE) | 33.1 | 29.4 |
| Degree of acetylation (% DAc) | — | — |

*percentage by weight of dry matter

TABLE 21

| Calcium conc. | Gel strength in grams | |
|---|---|---|
| (ppm) in gel | Example 22 | Example 23 |
| 233 | 336 | 207 |
| 466 | 540 | 229 |
| 699 | 710 | 519 |

Example 24

281.3 g of humid potato pulp (% AGA: 16.4; % DE: 46.1; % DAc: 11) with particle size ≦0.5 mm and a dry matter content of 14% by weight was suspended, under stirring, in about 1020 g of an aqueous solution (2.5° C.) containing 20.0 g of sodium chloride and 7.36 g of calcium chloride ($CaCl_2.2H_2O$) corresponding to 8.69 mmol of sodium chloride and 1.271 mmol of calcium chloride, respectively, per gram of plant dry matter. The weight of the suspension was 1304.5 g.

The suspension was stirred for 20 minutes at a temperature of 2.5-3° C., whereupon 2.56 g of pulverized calcium hydroxide ($Ca(OH)_2$), corresponding to 34.55 mmol or 0.887 mmol of calcium per gram of plant dry matter, was added gradually with vigorous stirring and maintained at pH=12±0.1. The amount of calcium hydroxide added was 26.43 mmol per kg of reaction mixture. The reaction mixture was stirred for 45 minutes at a temperature of 2.5-3° C., whereupon diluted sulphuric acid was added until pH=1.3.

The fibre-containing pectin product was processed and isolated as described in Example 20. The yield was 37.0 g with a dry matter content of 91.8% by weight. The analytical characteristics of the product are shown in Table 22.

With calcium ions the product formed stable gels. The gel strengths of gels with 233, 466, and 699 ppm of calcium, respectively, are shown in Table 23.

Example 25

281.3 g of moist potato pulp (same grade as used in Example 24) was treated according to the same procedure as described in Example 24, with the difference that 113.1 g of 0.5 N sodium hydroxide (56.55 mmol), corresponding to 1.436 mmol of sodium hydroxide per gram of plant dry matter, was used instead of 2.56 g of calcium hydroxide. The amount of sodium hydroxide added was 39.91 mmol per kg of reaction mixture.

The yield of fibre-containing pectin product was 37.0 g with a dry matter content of 91.6% by weight. The analytical characteristics of the product are shown in Table 22. With calcium ions the product formed stable gels. The gel strengths of gels with 233, 466, and 699 ppm, respectively, are shown in Table 23.

TABLE 22

| Analytical characteristics of fibre-containing pectin product from potato pulp | Example 24 | Example 25 |
|---|---|---|
| Anhydrogalacturonic acid (% AGA)* | 17.2 | 15.9 |
| Degree of esterification (% DE) | 14.7 | 5.5 |
| Degree of acetylation (% DAc) | 7.8 | 7.7 |

*percentage by weight of dry matter

TABLE 23

| Calcium conc. | Gel strength in grams | |
|---|---|---|
| (ppm) in gel | Example 24 | Example 25 |
| 233 | 217 | 197 |
| 466 | 350 | 274 |
| 699 | 473 | 328 |

Example 26

281.3 g of minced sugar beet slices (same grade as used in Example 18) was suspended, under stirring, in about 1020 g of an aqueous solution (2.5° C.) containing 20.0 g of sodium chloride and 7.36 g of calcium chloride ($CaCl_2.2H_2O$) corresponding to 11.061 mmol of sodium chloride and 1.618 mmol of calcium chloride, respectively, per gram of plant dry matter. The weight of the suspension was 1304.5 g.

The suspension was stirred for 20 minutes at a temperature of 2-3° C., whereupon 3.048 g of pulverized calcium hydroxide ($Ca(OH)_2$), corresponding to 41.14 mmol or 1.329 mmol of calcium per gram of plant dry matter, was added gradually with vigorous stirring and maintained at a pH of about 12. The amount of calcium hydroxide added was 31.47 mmol per kg of reaction mixture. The reaction mixture was stirred for 45 minutes at a temperature of 2-3° C., whereupon diluted sulphuric acid was added to pH=1.3.

The fibre-containing pectin product was processed and isolated as described in Example 20. The yield was 23.4 g with a dry matter content of 93.8% by weight. The analytical characteristics of the product are shown in Table 24. With calcium Ions the product formed stable gels. The gel strengths of gels with 233, 466, and 699 ppm of calcium, respectively, are shown in Table 25.

Example 27

562.5 g of minced sugar beet slices (same grade as used in Example 18) was suspended, under stirring, in about 1020 g of an aqueous solution (2° C.) containing 20.0 g of sodium chloride and 7.36 g of calcium chloride ($CaCl_2.2H_2O$) corresponding to 5.531 mmol of sodium chloride and 0.809 mmol of calcium chloride, respectively, per gram of plant dry matter. The weight of the suspension was 1585.6 g.

The suspension was stirred for 20 minutes at a temperature of about 2° C., whereupon 6.66 g of pulverized calcium hydroxide ($Ca(OH)_2$) was added gradually with vigorous stirring and maintained at pH=12.0±0.1. The amount of calcium hydroxide added was 56.46 mmol per kg of reaction mixture. The reaction mixture was stirred for 75 minutes at a temperature of 2-3° C., whereupon diluted sulphuric acid was added to pH=1.3.

The fibre-containing pectin product was processed and isolated as described in Example 20. The yield was 47.0 g with a dry matter content of 92.7% by weight. The analytical characteristics of the product are shown in Table 24. With calcium ions the product formed stable gels. The gel strengths of gels with 233, 466, and 699 ppm of calcium, respectively, are shown in Table 25.

Example 28

562.5 g of minced sugar beet slices (same grade as used in Example 18) was treated as described in Example 27, with the exception that 263.3 g of 0.5 N sodium hydroxide (131.65 mmol) corresponding to 2.127 mmol of sodium hydroxide per gram of plant dry matter or 71.24 mmol per kg of reaction mixture was used instead of 6.66 g of calcium hydroxide, and that the treatment time was 35 minutes.

The yield of fibre-containing pectin product was 47.1 g with a dry matter content of 93.2% by weight. The analytical characteristics of the product are shown in Table 24. With calcium ions the product formed stable gels. The gel strengths of gels with 466 and 699 ppm of calcium, respectively, are shown in Table 25. With less calcium content, e.g., 233 ppm of calcium, the product formed very viscous solutions.

TABLE 24

| Analytical characteristics of fibre-containing pectin product from sugar beet slices | Example 26 | Example 27 | Example 28 |
|---|---|---|---|
| Anhydrogalacturonic acid (% AGA)* | 29.3 | 25.2 | 30.2 |
| Degree of esterification (% DE) | 25.2 | 2.2 | 36.7 |
| Degree of acetylation (% DAc) | 6.3 | 5.2 | 7.8 |

*percentage by weight of dry matter

TABLE 25

| Calcium conc. | Gel strength in grams | | |
|---|---|---|---|
| (ppm) in gel | Example 26 | Example 27 | Example 28 |
| 233 | 57 | 79 | Viscous sol. |
| 466 | 128 | 254 | 32 |
| 699 | 157 | 360 | 53 |

Example 29

A beaker of 200 ml with a magnetic stirrer was tarred.

0.600%, 0.8000% and 1.000% by weight of a citrus pectin product provided by the present invention and 1.000%, 1.200% and 1.400% by weight of conventional citrus pectin product, respectively, was transferred to the beaker and 3 ml of isopropanol (IPA) was added under magnetic stirring. When the suspension was homogeneous 100 ml of boiling citrate buffer (se below) was added under stirring. After total dissolution of the polymer 250 mg sodium hexametaphosphate was added. The solution was stirred for two hours and weighted up to 100.0 grams. When the temperature was 20.0° C. the flow curve was determined at shear rates from 15-150

1/sec at a Haake Rheostress 1 (se below). The viscosity at 90 1/sec shear rate was plotted on a graph with concentration in % as the independent variable. Comparison to standards or other samples was done by determining the amount of samples necessary to give viscosity of 40 centipoise.

Citric Acid/Citrate Buffer:
A: 21.02 gram citric acid, monohydrate pr. liter ion exchanged water.
B: 29.41 gram trisodium citrate, dihydrate pr. liter ion exchanged water.
17 parts of A and 33 parts of B were mixed to give the final solution.

Hake Rheostress 1:
Sensor system rotor Z34 DIN 53019 Serie 1.
Water bath thermosetting was 20.0° C. heating the measuring cup Results FIG. 1 show that the pectin products obtained by the present invention has a higher viscosity at the concentration of pectin in the solution. This means that there are a functional gap between the two types of pectin products which indicates that one needs to add twice the amount of the conventional pectin product to obtain the same viscous giving properties (at 40 cp) as provided by the present invention.

REFERENCES

U.S. Pat. No. 5,567,462
U.S. Pat. No. 2,480,710
DE 4 013 765
DE 4 042 405
Food Chemical Codex, Fourth Edition, National Academic Press, Washington 1996, page 283

The invention claimed is:

1. A method for providing a fibre-containing pectin product from a plant material, said method comprising the steps of:
  (i) providing an in situ reaction system by swelling the plant material in an aqueous solution, wherein said aqueous solution comprises at least one salt;
  (ii) subjecting pectin present in the swollen plant material from step (i) to a de-esterification treatment in the presence of an alkaline reagent;
  (iii) separating the de-esterified fibre-containing pectin product, and
  wherein the alkaline reagent provided in step (ii) results in a pH above 10.

2. The method according to claim 1, wherein the aqueous solution does not contain an organic solvent.

3. The method according to claim 1, wherein the plant material is swelled in the aqueous solution for 1 to 120 minutes.

4. The method according to claim 1, wherein the plant material is swelled in the aqueous solution at a temperature in the range of 0-120° C.

5. The method according to claim 1, wherein the plant material is swelled in the aqueous solution providing a dry matter content of the plant material in a range from 1-50%.

6. The method according to claim 1, wherein the amount of the at least one salt corresponds to a salt concentration from 1 mmol to 30 mmol per gram of plant material dry matter.

7. The method according to claim 1, wherein the aqueous solution is an inorganic aqueous solution.

8. The method according to claim 1, wherein the at least one salt is a water-soluble or neutral salt.

9. The method according to claim 8, wherein the water-soluble or neutral salt is selected from the group consisting of sodium salts, potassium salts, calcium salts, chloride salts, and nitrate salts or mixtures thereof.

10. The method according to claim 1, wherein the de-esterification treatment is continued for 1 to 120 minutes.

11. The method according to claim 1, wherein the de-esterification treatment is performed at a temperature in the range of 0-120° C.

12. The method according to claim 1, wherein the de-esterification treatment is performed with a dry matter content of the plant material in a range from 1-50%.

13. The method according to claim 1, wherein the alkaline reagent is selected from the group consisting of ammonia, a low molecular weight amine, a low molecular weight diamine, a low molecular weight amino acid, sodium hydroxide, potassium hydroxide, calcium hydroxide and an organic base hydroxide.

14. The method according to claim 1, wherein the amount of alkaline reagent is from 20 mmol to 80 mmol of basic reagent per gram of pectin-containing plant dry matter.

15. The method according to claim 1, wherein the plant material is further subjected to an amidation treatment.

16. The method according to claim 15, wherein the amidation treatment comprises addition of an amidation reagent selected from the group consisting of ammonia, a low molecular weight amine, a low molecular weight diamine and a low molecular weight amino acid.

17. The method according to claim 15, wherein the swollen plant material obtained in step (i) is treated with the amidation reagent for 1 to 120 minutes.

18. The method according to claim 15, wherein the swollen plant material obtained in step (i) is treated with the amidation reagent at a temperature in the range of −15 to 75° C.

19. The method according to claim 1, wherein the separated and de-esterified fibre-containing product obtained in step (iii) is subjected to at least one washing step or at least one pressing step to obtain the fibre-containing pectin product.

20. The method according to claim 19, wherein the washed or pressed fibre-containing pectin product is dried to a dry matter content of at least 90% by weight.

21. The method according to claim 1, wherein the fibre-containing pectin product has a degree of esterification from 0-80° C.

22. The method according to claim 1, wherein the fibre-containing pectin product has a degree of amidation of not more that 95%.

23. The method according to claim 1, wherein the fibre-containing pectin product obtained in step (iii) has a dry matter content of at least 1% (w/w) of the dry matter.

24. The method according to claim 1, wherein the plant material is obtained from a native vegetable material in a fresh or dried state.

25. The method according to claim 1, wherein the plant material is selected from the group consisting of potato pulp, sugar beet pulp, pomace residues from apples, peels from citrus fruits, and pulp from citrus fruits.

26. A method for providing a pectin product, said method comprising the steps of:
  (i) providing an in situ reaction system by swelling the plant material in an aqueous solution, wherein said aqueous solution comprises at least one salt;
  (ii) subjecting pectin present in the swollen plant material from step (i) to a de-esterification treatment in the presence of an alkaline reagent;

(iii) separating the de-esterified fibre-containing pectin product, wherein the alkaline reagent provided in step (ii) results in a pH above 10, (iv) adding an extraction medium to the fibre-containing pectin product providing an extraction suspension;

(v) adjusting the pH of the extraction suspension to a pH in the range of 1-12;

(vi) adjusting the temperature of the extraction suspension to a temperature in the range of 0-120° C.; and (vii) isolating the pectin product from the aqueous phase of the extracting medium.

27. The method according to claim 26, wherein the extraction medium has a pH in the range of 1-6.

28. The method according claim 26, wherein the temperature is in the range of 40-100° C.

29. The method according claim 26, wherein the pectin product is isolated by a method selected from the group consisting of precipitation, extraction, centrifugation, filtration, chromatography and drying.

* * * * *